United States Patent
Kwon et al.

(10) Patent No.: US 10,575,267 B2
(45) Date of Patent: Feb. 25, 2020

(54) SYSTEM AND METHOD FOR PROVIDING WEIGHTED PATTERN DEMAPPER FOR BLUETOOTH® LOW ENERGY LONG RANGE

(71) Applicant: Samsung Electronics Co., Ltd., Gyeonggi-do (KR)

(72) Inventors: Hyukjoon Kwon, San Diego, CA (US); Linbo Li, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 24 days.

(21) Appl. No.: 15/452,132

(22) Filed: Mar. 7, 2017

(65) Prior Publication Data

US 2018/0192381 A1 Jul. 5, 2018

Related U.S. Application Data

(60) Provisional application No. 62/442,576, filed on Jan. 5, 2017.

(51) Int. Cl.
| | |
|---|---|
| *H04L 27/14* | (2006.01) |
| *H04W 56/00* | (2009.01) |
| *H04L 27/10* | (2006.01) |
| *H04L 27/16* | (2006.01) |
| *H04W 4/80* | (2018.01) |

(52) U.S. Cl.
CPC ........... *H04W 56/001* (2013.01); *H04W 4/80* (2018.02)

(58) Field of Classification Search
CPC . H04L 27/12; H04L 27/14; H04L 2027/0095; H04W 56/001

USPC .................................................. 375/354, 368
See application file for complete search history.

(56) References Cited

U.S. PATENT DOCUMENTS

| | | |
|---|---|---|
| 7,110,793 B1 * | 9/2006 | Ishida ................. H04B 7/0615 455/458 |
| 7,173,990 B2 | 2/2007 | Kim et al. |
| 7,327,795 B2 | 2/2008 | Oprea |
| 7,327,800 B2 | 2/2008 | Oprea et al. |
| 7,369,626 B1 | 5/2008 | Chiodini et al. |
| 7,636,401 B2 | 12/2009 | Hammerschmidt |
| 7,643,585 B2 | 1/2010 | Sawada |
| 7,694,206 B2 | 4/2010 | Sawada |
| 7,971,128 B2 | 6/2011 | Sugiura et al. |
| 8,050,342 B2 | 11/2011 | Wang et al. |
| 8,238,272 B2 | 8/2012 | Aizawa |
| 8,259,862 B2 | 9/2012 | Peng et al. |
| 8,290,101 B2 | 10/2012 | Hamamoto |
| 8,750,433 B2 | 6/2014 | Adachi et al. |
| 9,276,788 B2 | 3/2016 | Gopalan |
| 2004/0192218 A1 | 9/2004 | Oprea |
| 2005/0207519 A1 * | 9/2005 | Phang ................. H04L 27/2278 375/354 |
| 2006/0207519 A1 * | 9/2006 | Gorans ................. A01K 45/00 119/713 |

(Continued)

*Primary Examiner* — Khaled M Kassim
*Assistant Examiner* — Jason A Harley
(74) *Attorney, Agent, or Firm* — The Farrell Law Firm, P.C.

(57) ABSTRACT

A method and apparatus are provided. The method includes receiving a signal from a transceiver, demapping a bit pattern encoded within the signal, detecting a preamble based on the demapped bit pattern, and synchronizing the transceiver to a receiver using the preamble, wherein demapping the bit pattern is based on weighting coefficients.

20 Claims, 6 Drawing Sheets

(56) References Cited

U.S. PATENT DOCUMENTS

| | | | |
|---|---|---|---|
| 2007/0011639 A1* | 1/2007 | Pitts | G06F 17/5072 |
| | | | 716/52 |
| 2007/0195444 A1* | 8/2007 | Annampedu | G11B 20/10046 |
| | | | 360/39 |
| 2009/0221253 A1* | 9/2009 | Yamamoto | H04B 7/0851 |
| | | | 455/273 |
| 2010/0194399 A1* | 8/2010 | Cho | G11C 29/56 |
| | | | 324/501 |
| 2011/0052195 A1 | 3/2011 | Karstens | |
| 2011/0103528 A1* | 5/2011 | Khayrallah | H04L 25/03229 |
| | | | 375/341 |
| 2012/0027132 A1* | 2/2012 | Rouquette | H04L 27/14 |
| | | | 375/334 |
| 2015/0092888 A1 | 4/2015 | Han et al. | |
| 2015/0189432 A1* | 7/2015 | Yuzuriha | H04R 3/00 |
| | | | 381/94.1 |

* cited by examiner

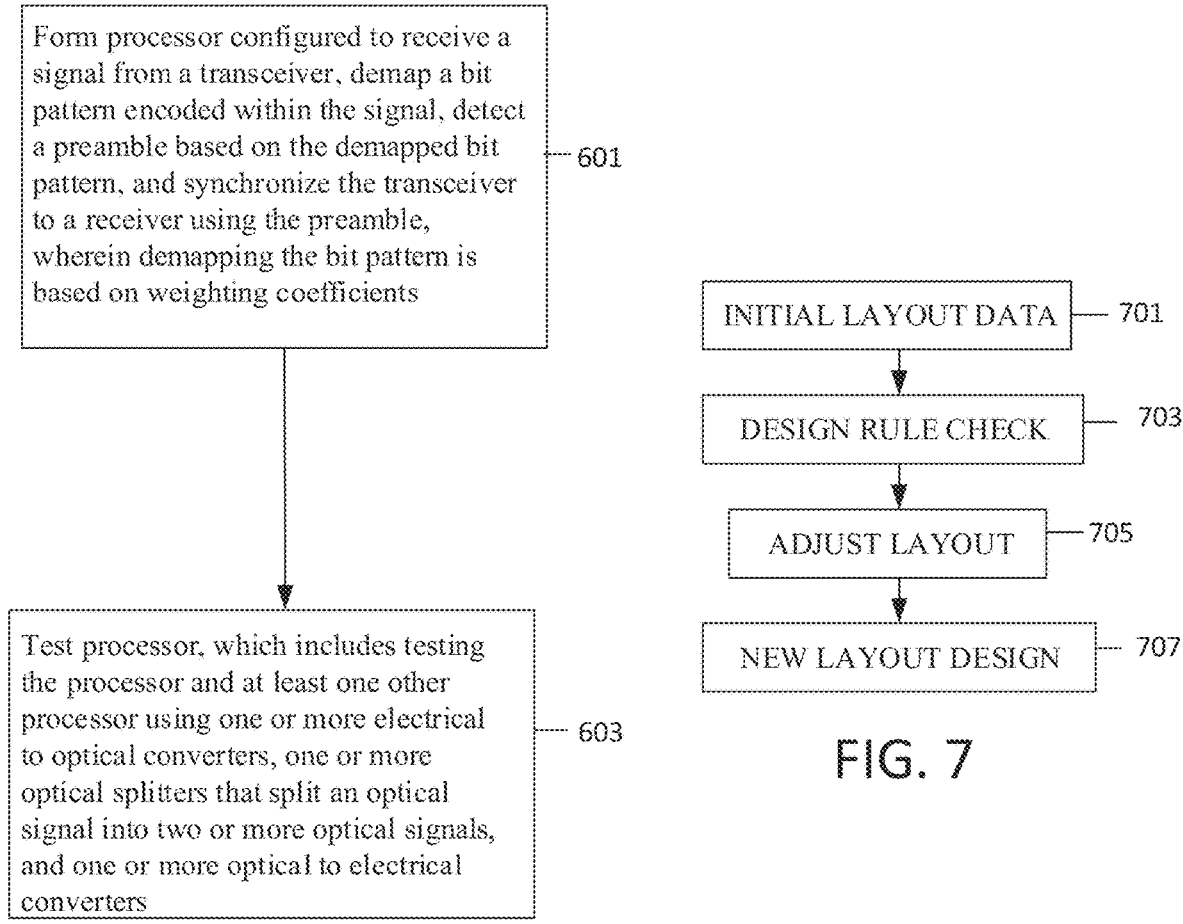

SYSTEM AND METHOD FOR PROVIDING WEIGHTED PATTERN DEMAPPER FOR BLUETOOTH® LOW ENERGY LONG RANGE

PRIORITY

This application claims priority under 35 U.S.C. § 119(e) to U.S. Provisional Patent Application No. 62/442,576 which was filed in the U.S. Patent and Trademark Office on Jan. 5, 2017, the entire content of which is incorporated herein by reference.

FIELD

The present disclosure generally relates to wireless communication systems, and more particularly, to a method and apparatus for providing a weighted pattern demapper for Bluetooth® low energy long range.

BACKGROUND

Wireless technologies for communication between devices are increasing in order to enable the Internet of things (IoT) and communication between communication devices. Bluetooth® is a wireless technology standard for exchanging data typically over short distances between fixed and mobile devices and personal area networks (PANs). Bluetooth® operates at frequencies in the globally unlicensed industrial, scientific and medical (ISM) 2.4 GHz short-range radio frequency band. Bluetooth® uses a modulated radio technology called Gaussian frequency shift keying (GFSK). Bluetooth® divides transmitted data into frames, and transmits each frame on one of 79 designated Bluetooth® channels. Each channel has a bandwidth of one megahertz (MHz). Bluetooth® low energy (Bluetooth® LE, or BLE) is a wireless personal area network technology specified by the Bluetooth® Special Interest Group (SIG) aimed at novel applications in the healthcare, fitness, location beacons, security, and home entertainment industries. Compared to Bluetooth®, BLE is intended to provide considerably reduced power consumption and cost while maintaining a similar communication range. The communication range for BLE is limited for certain applications and therefore a long range version of BLE enables devices to communicate over long ranges and increases a communication coverage area. BLE long range (LR) may require modifications to the communication protocol to effectively communicate over a long range. Methods relating to access code and data payloads need to be upgraded to more robust methods including encoding. On Dec. 6, 2016, the Bluetooth® SIG adopted the Bluetooth® Core Version 5.0 specification, which includes the requirements of the original Core Version 4.0 specification, its addenda and supplement, and adds new features and benefits including requirements for BLE LR.

SUMMARY

According to an aspect of the present disclosure, a method is provided which includes receiving a signal from a transceiver, demapping a bit pattern encoded within the signal, detecting a preamble based on the demapped bit pattern, and synchronizing the transceiver to a receiver using the preamble, wherein demapping the bit pattern is based on weighting coefficients.

According to another aspect of the present disclosure, an apparatus is provided which includes a memory, a processor, and a receiver configured to receive a signal from a transceiver, demap a bit pattern encoded within the signal, detect a preamble based on the demapped bit pattern, and synchronize the transceiver to a receiver using the preamble, wherein demapping the bit pattern is based on weighting coefficients.

According to another aspect of the present disclosure, a method of manufacturing a processor is provided which includes forming the processor as part of a wafer or a package that includes at least one other processor, wherein the processor is configured to receive a signal from a transceiver, demap a bit pattern encoded within the signal, detect a preamble based on the demapped bit pattern, and synchronize the transceiver to a receiver using the preamble, wherein demapping the bit pattern is based on weighting coefficients.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to receive a signal from a transceiver, demap a bit pattern encoded within the signal, detect a preamble based on the demapped bit pattern, and synchronize the transceiver to a receiver using the preamble, wherein demapping the bit pattern is based on weighting coefficients.

BRIEF DESCRIPTION OF THE DRAWINGS

The above and other aspects, features and advantages of the present disclosure will become more apparent from the following detailed description, when taken in conjunction with the accompanying drawings, in which:

FIG. 6 illustrates an exemplary flowchart of a method of testing a processor of the present weighted pattern demapper, according to one embodiment; and FIG. 7 illustrates an exemplary flowchart of a method of manufacturing a processor of the present weighted pattern demapper, according to one embodiment.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to "when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
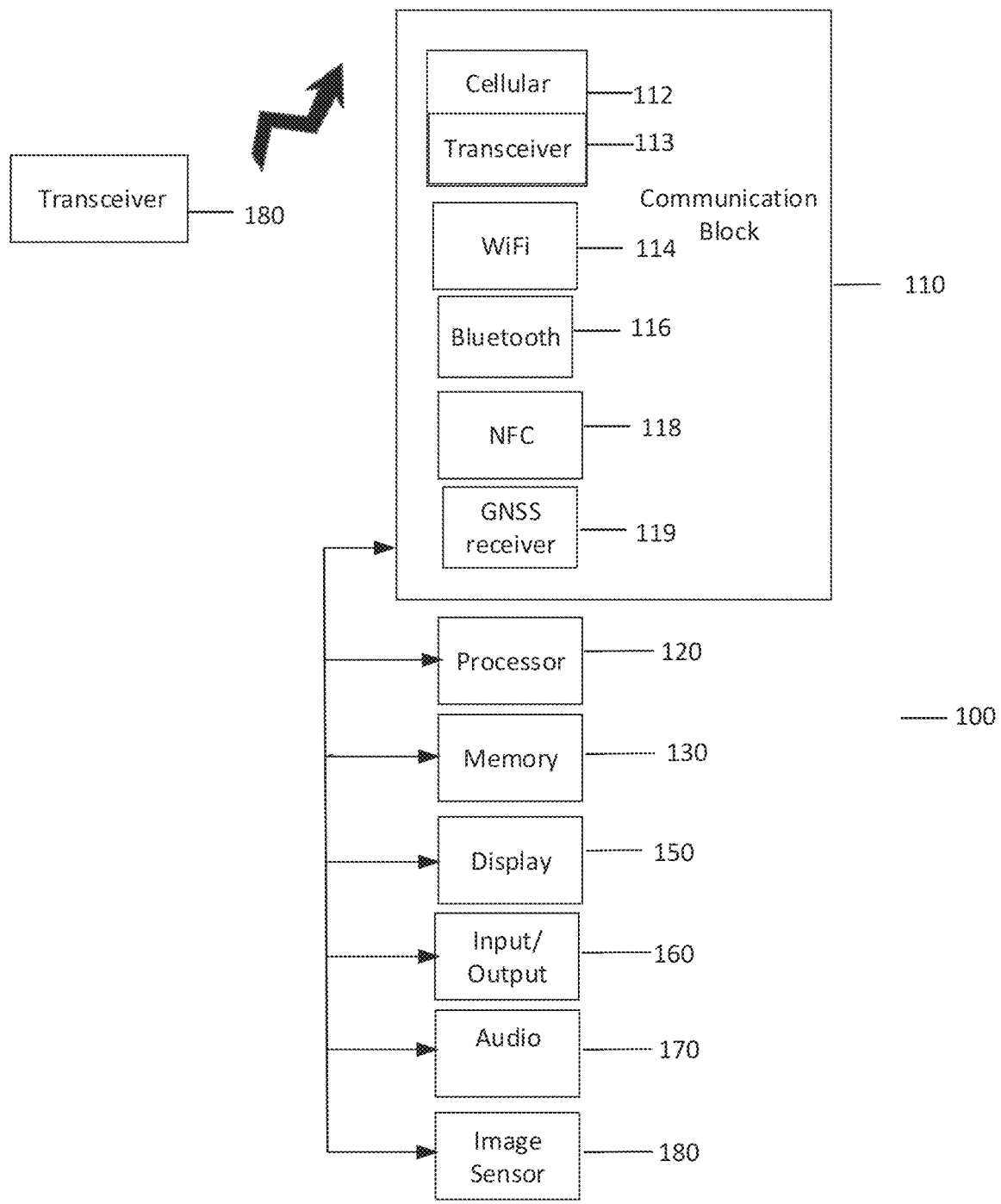
FIG. 1 illustrates an exemplary block diagram of an electronic device in a communication network, according to one embodiment.

FIG. 1 illustrates an exemplary block diagram of an electronic device in a network environment, according to one embodiment.

Referring to FIG. 1, an electronic device 100 includes, but is not limited to, a communication block 110, a processor 120, a memory 130, a display 150, an input/output block 160, an audio block 170 and a wireless transceiver 180. The wireless transceiver 180 may be included in a Bluetooth® device or cellular base station and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such as second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth® communications block 116 provides personal area direct and networked communications using technologies such as IEEE 802.15 and BLE LR. The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a Bluetooth® device or a terrestrial base transceiver station (BTS) (such as a cellular base station) and include a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or Bluetooth® block 116. The Bluetooth® block 116 may also have a local processor or a chipset which dedicates computing resources to Bluetooth® block 116 and other functional blocks such as weighted pattern demapper blocks.

The memory 130 provides storage for device control program code, user data storage, application code and data storage. The memory 130 may provide data storage for the firmware, libraries, databases, lookup tables, algorithms, methods, channel estimation parameters, and calibration data required by the cellular communications block 112 or Bluetooth® block 116. The program code and databases required by the cellular communications block 112 or Bluetooth® block 116 may be loaded into local storage from the memory 130 upon device boot up. The cellular communications block 112 or Bluetooth® block 116 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The wireless transceiver 180 may be included in a Bluetooth® device, an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be a Bluetooth® device, an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), servers or a combination thereof. The wireless transceiver 180 may be used to transmit the communication signals, such as voice or data.

According to one embodiment, a system and method is provided for a weighted pattern demapper for BLE LR.

The Bluetooth® version 5 core specification published by the Bluetooth® SIG includes the requirements for enhancing Bluetooth® coverage range up to 1 kilometer (km). To meet the requirements for a 1 km range, the Bluetooth® version 5 core specification adopts a method for encoding the access code and payload in order to increase communication reliability over the longer range. Thus, a bit 0 and a bit 1 are encoded as 0011 and 1100, respectively. For example, when data bits are assigned to be the sequence of [0 0 1 0 1], its coded sequence becomes [0 0 1 1 0 0 1 1 1 1 0 0 0 0 1 1 1 1 0 0]. As a result, the coded bit sequence becomes more reliable and increases the coverage range further. For the purpose of symbol timing synchronization within a Bluetooth® receiver, the preamble and access address within the access code field of a Bluetooth® frame are transmitted with a fixed known bit sequence. Each BLE frame may include four fields: a preamble, a payload including an access address, a protocol data unit (PDU), and a cyclic redundancy check (CRC). These fields may be arranged in a Bluetooth® LE frame from the least significant bit (LSB) to the most significant bit (MSB) as follows: the preamble (1 octet), the access address (4 octets), the protocol data unit (2-39 octets), and the cyclic redundancy check (3 octets). The BLE LR receiver detects the pre-defined 8 symbols of the preamble to determine a starting point of the payload and synchronize symbol timing between the transmitter and receiver.

According to one embodiment, the present system and method detects the encoded pre-defined pattern of encoded buts, e.g., 0 0 1 1 or 1 1 0 0. Given the encoded bit sequences of the preamble, the pattern demapper is needed to synchronize the receiver to the transmitter, and to estimate and compensate for any frequency offsets between the transmitter and the receiver.

A typical receiver method converts the pre-defined bit sequences into binary sequences, and directly applies the binary sequences to the received signal. For example, when the received signal at the kth sample is $y_k$, the demapper defined by Equation (1) below is matched with bit pattern [0 0 1 1] or [1 1 0 0] and produces the largest value in either a positive or negative direction (ie. produces the maximum or minimum value).

$$y_{k+3}+y_{k+2}-y_{k+1}-y_k \lessgtr 0, \quad (1)$$

Figure 2:
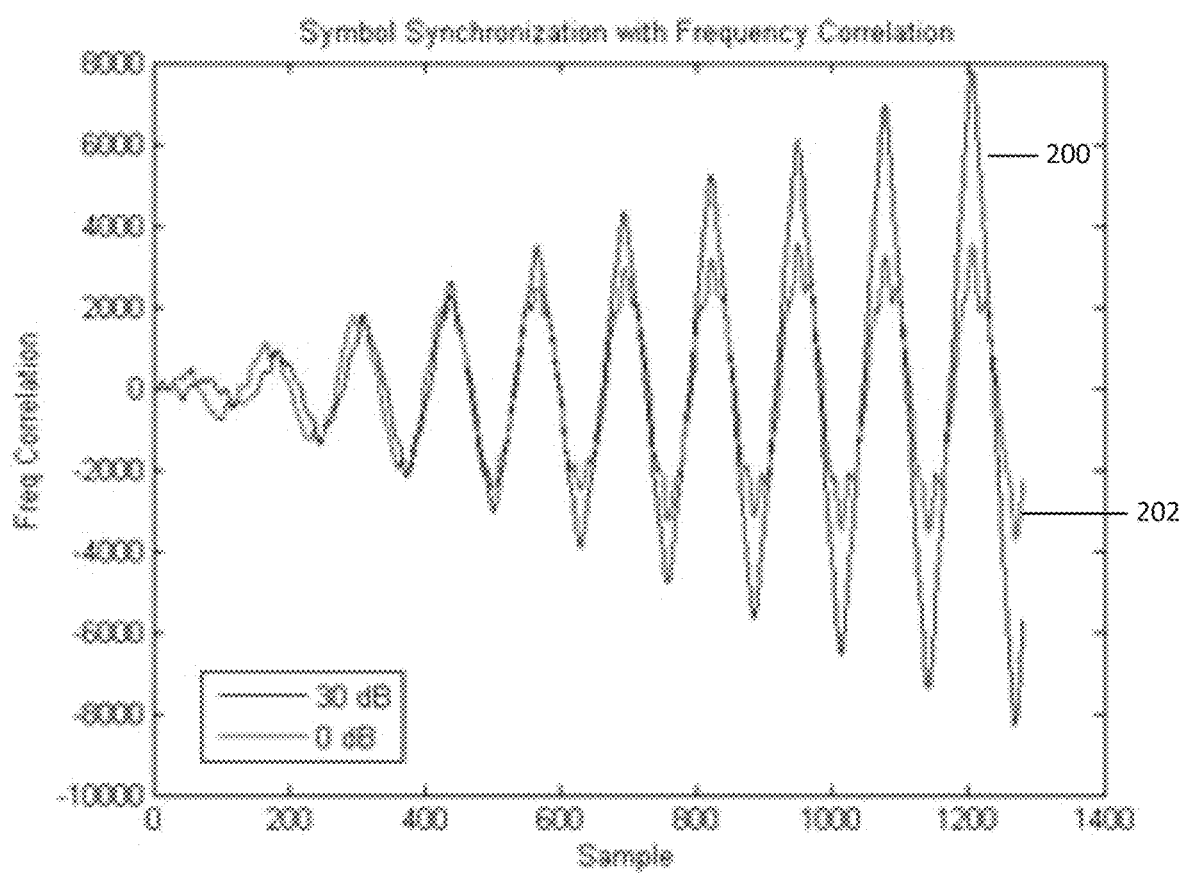
FIG. 2 illustrates an exemplary plot of accumulated signal magnitude over a number of samples, according to one embodiment.

FIG. 2 illustrates an exemplary graph of accumulated signal magnitude over a number of samples, according to one embodiment. Referring to FIG. 2, the horizontal axis represents the sample index of a received signal and the vertical axis represent frequency correlation. As shown in FIG. 2, the frequency correlation alternates between positive and negative values as the sample index increases and the magnitude of the frequency correlation increases as the sample index increases. Curve 200 represents an SNR of 30 dB and curve 202 represents an SNR of 0 dB.

According to one embodiment, the present system and method provides a pattern demapper with optimal weighting coefficients for a signal received over a communication channel with Gaussian distributed noise. The weighting coefficients may vary based on whether a priori information is available or not. In this case, the a priori information indicates the symbol before and the symbol after the current symbol to be detected. The present system and method may be applicable to BLE LR, in which the transmitted signal is modulated using Gaussian frequency shift keying (GFSK). In GFSK, baseband pulses consisting of −1 and 1 are passed through a Gaussian filter before modulation rather than directly modulating the carrier frequency with the digital data symbols, thereby making the edges of the pulses smoother and hence limiting the modulated spectrum width in a process referred to as pulse shaping. Using the Gaussian filter before modulation has the advantage of reducing sideband power and interference with neighboring channels, but has the disadvantage of increasing ISI.

Figure 3:
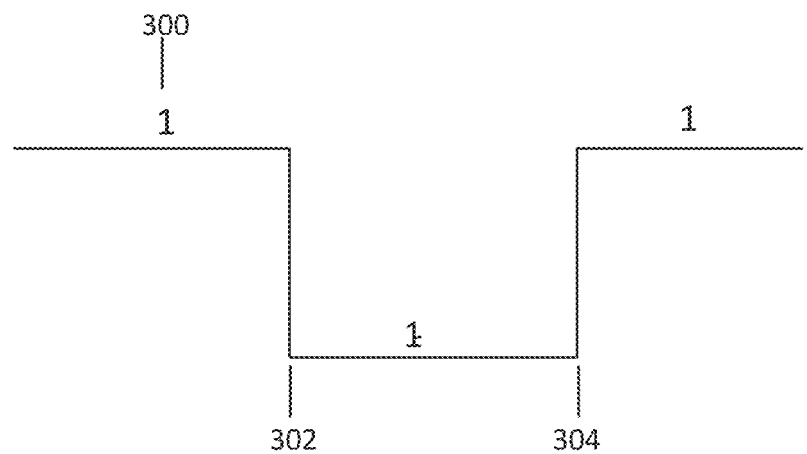
FIG. 3 illustrates an exemplary graph of a baseband signal over time, according to one embodiment.

FIG. 3 illustrates an exemplary plot of a baseband signal over time, according to one embodiment.

Referring to FIG. 3, a plot of a baseband signal over time illustrates the baseband signal switches from a value of 1 to −1 and then back to 1. At time 300, the baseband signal initially has a value of 1. At time 302, the baseband signal abruptly switches to a value of −1. At time 304, the baseband signal abruptly switches back to a value of 1.

Figure 4:
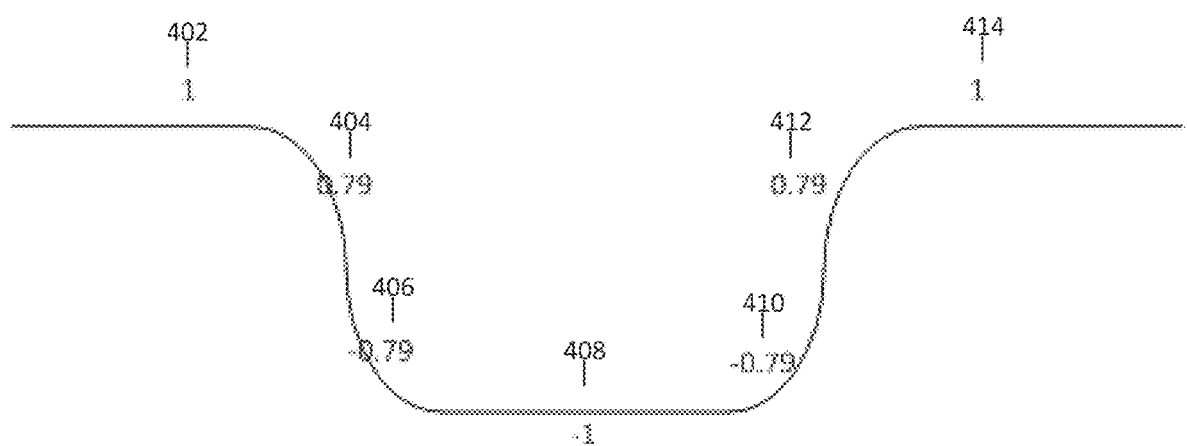
FIG. 4 illustrates an exemplary plot of a GFSK modulated baseband signal over time, according to one embodiment.

FIG. 4 illustrates an exemplary plot of a GFSK modulated baseband signal over time, according to one embodiment.

Referring to FIG. 4, a GFSK modulation scheme changes the signal from 1 to −1 and from −1 to 1 over time while the Gaussian filter provides a smooth transition between switching states. However, GFSK modulation may generate ISI. ISI is an undesirable form of signal distortion in which one transmitted symbol interferes with subsequent transmitted symbols. The interference from previously transmitted symbols may have a similar effect as noise, making communication less reliable. The values between 1 and −1 as shown in FIG. 4 may change based on GFSK modulation parameters. The values of 0.79 and −0.79 are exemplary and other values are within the scope of the present disclosure.

Referring to FIG. 4, a plot of a GFSK modulated baseband signal over time illustrates the signal switches from a value of 1 to −1 and then back to 1 with a smooth transition between the values of 1 and −1. At time 402, the baseband signal initially has a value of 1. At time 404, the baseband signal smoothly transitions to a value of 0.79. At time 406, the baseband signal smoothly transitions to a value of −0.79. At time 408, the baseband signal smoothly transitions to a value of −1. At time 410, the baseband signal smoothly transitions back to a value of −0.79. At time 412, the baseband signal smoothly transitions to a value of 0.79. At time 414, the baseband signal smoothly transitions back to a value of 1.

According to one embodiment, the present system and method improves a typical pattern demapper for BLE LR from Equation (1), as described above:

$$y_{k+3}+y_{k+2}-y_{k+1}-y_k \lessgtr 0 \quad (1)$$

to Equation (2):

$$\gamma_{k+3}y_{k+3}+\gamma_{k+2}y_{k+2}+\gamma_{k+1}y_{k+1}+\gamma_k y_k+\bar{\gamma}_k \lessgtr 0 \quad (2)$$

where $\gamma_{k+3}$, $\gamma_{k+2}$, $\gamma_{k+1}$, and $\gamma_k$ are the weighting coefficients for the pattern demapper of the present disclosure, and $\bar{\gamma}_k$ is the bias term as defined by Equation (12) below. The weighting coefficients may be changed based on whether there is a priori information, i.e., information on the symbol before and the symbol after the current symbol to be detected.

BLE LR encodes the bit sequences that are concatenated and transmitted using the pattern [0 0 1 1] or [1 1 0 0] for unencoded bit 0 and bit 1 respectively. A GFSK modulation block in a transmitter modulates an input bit stream with a Gaussian pulse shaping filter at a 16 times oversampling rate for the input bit stream. The time domain expression of Gaussian pulse shaping is a convolution of a rectangular function and a time domain Gaussian impulse response function. As a result, the time domain signal for GFSK may be expressed as shown in Equation (3):

$$s(t) = A\cos\left(\pi f_c t + h\pi \int_{-\infty}^{\tau}\sum_k a_k g_{GFSK}\left(\tau - k\frac{T_b}{16}\right)d\tau\right) \quad (3)$$

where $g_{GFSK}(t)$ may be expressed as shown in Equation (4):

$$g_{GFSK}(t) = g_{RECT}(t) * h_{GAUSS}(t) =$$

$$\frac{1}{2}\left[\mathrm{erfc}\left(\pi\sqrt{\frac{2}{\ln(2)}}BT_b\left(\frac{t}{T_b}-\frac{1}{2}\right)\right) - \mathrm{erfc}\left(\pi\sqrt{\frac{2}{\ln(2)}}BT_b\left(\frac{t}{T_b}+\frac{1}{2}\right)\right)\right] \quad (4)$$

$h_{GAUSS}$ may be expressed as shown in Equation (5):

$$h_{GAUSS}(t) = \sqrt{\frac{2\pi}{\ln(2)}}Be^{-2\frac{(B\pi)^2}{\ln(2)}t^2} \quad (5)$$

and $g_{RECT}$ may be expressed as shown in Equation (6):

$$g_{RECT}(t) = \begin{cases} 1, & -\frac{T_b}{2} \le t \le \frac{T_b}{2} \\ 0 & \text{else} \end{cases} \quad (6)$$

where B is the 3 dB bandwidth, and $T_b$ is a bit period. B and $T_b$ are design parameters which satisfy $B*T_b=0.5$, h is the GFSK modulation index with values that may vary between 0.45 and 0.55 for BLE. As shown in Equation (3) above, the signal s(t), is a function of $$\sum_k a_k g_{GFSK}\left(\tau - k\frac{T_b}{16}\right)d\tau$$

such that a current symbol to be detected is affected by previous signals resulting in ISI.

For example, when a transmitter encodes bit 1 to pattern [1 1 0 0], if there is no ISI, [1 1 0 0] is directly mapped to [−1 −1 +1 +1] such that according to Equation (1), $y_{k+3}+y_{k+2}-y_{k+1}-y_k$ produces the minimum value of −4. In the presence of ISI in GFSK modulation, the encoded bit 1 pattern of [1 1 0 0] is mapped to e.g., [−1 −0.79 0.79 +1], according to the smooth transition illustrated in FIG. 4, in which case the typical demapper is no longer optimal to produce the maximum/minimum values.

In the presence of ISI caused by GFSK modulation, the present system determines the optimal coefficients and the bias term to maximize the likelihood function. Given the received 4 symbols represented by Equation (1), $y=[y_{k+3}\ y_{k+2}\ y_{k+1}\ y_k]$, the probability of the kth unmodulated symbol, $b_k$, may be expanded and represented as shown in Equation (7):

$$P(b_k = 0|y) = P(a_{k+3} = 0, a_{k+2} = 0, a_{k+1} = 1, a_k = 1|y) = \quad (7)$$

$$P(a_{k+3}, a_{k+2}, a_{k+1}, a_k, y)/P(y) =$$

$$P(y|a_{k+3}, a_{k+2}, a_{k+1}, a_{k=0})P(a_k)\prod_i P(a_{k+i}|a_k, \ldots, a_{k+i-1})/P(y)$$

where $a_k$ is the kth modulated symbol corresponding to $b_k$. In BLE LR, the pattern [0 0 1 1] or [1 1 0 0], representing bits 0 and 1 respectively is already determined such that $P(a_{k+i}|a_k, \ldots a_{k+i-1})=1$. Resulting in the following Equation (8):

$$\arg\max P(b_k=0|y)=\arg\max P(y|a_{k+3},a_{k+2},a_{k+1},a_k) \quad (8)$$

In the presence of signal noise which has a Gaussian distribution and a unit variance, the probability of y is given as shown in Equation (9):

$$P(y|a_{k+3},a_{k+2},a_{k+1},a_k)=\Pi_i P(y_{k+i}|a_{k+i}, \ldots a_k) \quad (9)$$

Due to ISI, the binary symbol, ±1, may be generalized to $\alpha_i$ and $\beta_i$ at the ith symbol and the transitions between +1 to −1 and −1 to +1 are made smoothly over time. The optimal criterion to demodulate the pattern mapped for symbols in BLE LR is shown in Equation (10):

$$P(b_k=0|y) \lessgtr P(b_k=1|y) \quad (10)$$

which may be expressed by the log likelihood ratio (LLR), $L_k$, at the kth symbol.

The LLR determined in the presence of ISI may be expressed as shown in Equation (11):

$$L_{k+i} = \quad (11)$$

$$-\frac{1}{\sigma^2}(|y_{k+i} + \alpha_i|^2 - |y_{k+i} + \beta_i|^2) = -\frac{1}{\sigma^2}(2(\alpha_i - \beta_i)y_{k+i} + \alpha_i^2 - \beta_i^2)$$

As a result, the following weighting coefficients may be derived as shown in Equation (12):

$$\tfrac{1}{2}(\alpha_3-\beta_3)y_{k+3}+\tfrac{1}{2}(\alpha_2-\beta_2)y_{k+2}+\tfrac{1}{2}(\alpha_1-\beta_1)y_{k+1}+\tfrac{1}{2}(\alpha_0-\beta_0)y_k-\tfrac{1}{4}\Sigma_i(\alpha_i^2-\beta_i^2) \lessgtr 0 \quad (12)$$

Referring to the illustration of a GFSK modulated baseband signal as shown in FIG. 4, the typical values of $\beta_i$ are shown in Table 1 for pattern 0011.

TABLE 1

| Previous symbol, next symbol | 0 | 0 | 1 | 1 |
| --- | --- | --- | --- | --- |
| 00 | −1 | −0.79 | 0.79 | 0.79 |
| 01 | −1 | −0.79 | 0.79 | 1 |

TABLE 1-continued

| Previous symbol, next symbol | 0 | 0 | 1 | 1 |
|---|---|---|---|---|
| 10 | −0.79 | −0.79 | 0.79 | 0.79 |
| 11 | −0.79 | −0.79 | 0.79 | 1 |

Referring to the illustration of a GFSK modulated baseband signal as shown in FIG. 4, the typical values of $\alpha_i$ are shown in Table 2 for pattern 1100.

TABLE 2

| Previous symbol, next symbol | 1 | 1 | 0 | 0 |
|---|---|---|---|---|
| 00 | 0.79 | 0.79 | −0.79 | −1 |
| 01 | 0.79 | 0.79 | −0.79 | −0.79 |
| 10 | 1 | 0.79 | −0.79 | −1 |
| 11 | 1 | 0.79 | −0.79 | −0.79 |

The value of 0.79 is a typical value for a GFSK modulation index of h=0.5. The binary number distorted by ISI may be an arbitrary one. The value is derived based on Equations (3) to (6) and Equations (10) and (11), where a Gaussian assumption is used.

When a priori information on the previous and next encoded bits in the pattern are available, i.e., x and y are known for [x 0 0 1 1 y] or [x 1 1 0 0 y], both Table 1 and Table 2 above may be directly applied to derive the optimal weighting coefficients. The result is given below in Table 3.

TABLE 3

| Previous symbol, next symbol | Weighted pattern demapper according to Equation (2) |
|---|---|
| 00/11 | $0.89\ y_{k+3} + 0.79\ y_{k+2} − 0.79\ y_{k+1} − 0.89\ y_k$ |
| 01 | $0.89\ y_{k+3} + 0.79\ y_{k+2} − 0.79\ y_{k+1} − 0.89\ y_k + 0.19$ |
| 10 | $0.89\ y_{k+3} + 0.79\ y_{k+2} − 0.79\ y_{k+1} − 0.89\ y_k − 0.19$ |

Referring to Table 3, the bias term values of +0.19 and −0.19 are determined according to Equation (13):

$$\tfrac{1}{4}\Sigma_i(\alpha_i^2-\beta_i^2)=\tfrac{1}{4}*\pm(0.79^2+0.79^2+(-0.79)^2+(-0.79)^2-1-(-0.79)^2-0.79^2-1)=\pm 0.1879\approx 0.19,\text{ given a set of (prev,next)=(01 or 10)} \quad (13)$$

If a priori information is not available, the present system derives the average value between 1 and 0.79, which is 0.9. The result is given below in Table 4.

TABLE 4

| Previous symbol, next symbol | Weighted pattern demapper according to Equation (2) |
|---|---|
| 00/11/01/10 | $0.9\ y_{k+3} + 0.79\ y_{k+2} − 0.79\ y_{k+1} − 0.9\ y_k$ |

According to one embodiment, the present BLE LR pattern demapper may be used for timing synchronization by detecting the 8 symbol preamble used to determine the beginning of a data payload in a frame. The present BLE LR pattern demapper may have non-binary weighting coefficients and a bias term. The present system may use a priori information to determine the weighting parameters and the weighting coefficients may be changed depending on GFSK modulation parameters.

Figure 5:
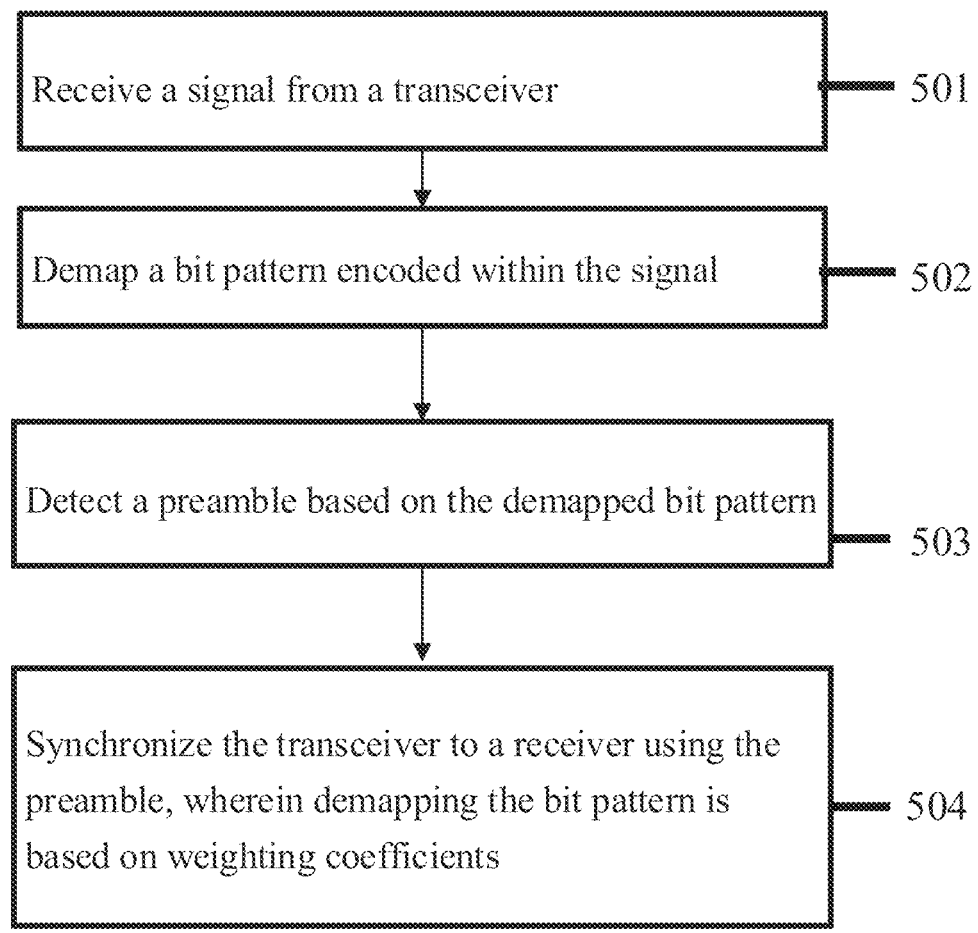
FIG. 5 illustrates an exemplary flowchart of the present weighted pattern demapper, according to one embodiment.

FIG. 5 illustrates an exemplary flowchart of the present weighted pattern demapper, according to one embodiment.

Referring to the flowchart of FIG. 5, the present method, at 501, receives a signal from a transceiver. At 502, the method demaps a bit pattern encoded within the signal. At 503, the method detects a preamble based on the demapped bit pattern. At 504, the method synchronizes the transceiver to a receiver using the preamble, wherein demapping the bit pattern is based on weighting coefficients.

FIG. 6 is a flowchart of a method of testing a processor of the present weighted pattern demapper, according to one embodiment, where the processor is either implemented in hardware or implemented in hardware that is programmed with software.

Referring to FIG. 6, the method, at 601, forms the processor as part of a wafer or package that includes at least one other processor. The processor is configured to receive a signal from a transceiver, demap a bit pattern encoded within the signal, detect a preamble based on the demapped bit pattern, and synchronize the transceiver to a receiver using the preamble, wherein demapping the bit pattern is based on weighting coefficients.

At 603, the method tests the processor, which includes testing the processor and at least one other processor using one or more electrical to optical converters, one or more optical splitters that split an optical signal into two or more optical signals, and one or more optical to electrical converters.

FIG. 7 is a flowchart of a method of manufacturing a processor of the present weighted pattern demapper, according to one embodiment. Referring to FIG. 7, the method, at 701, includes an initial layout of data in which the method generates a mask layout for a set of features for a layer of an integrated circuit. The mask layout includes standard cell library macros for one or more circuit features that include a processor. The processor is configured to receive a signal from a transceiver, demap a bit pattern encoded within the signal, detect a preamble based on the demapped bit pattern, and synchronize the transceiver to a receiver using the preamble, wherein demapping the bit pattern is based on weighting coefficients.

At 703, there is a design rule check in which the method disregards relative positions of the macros for compliance to layout design rules during the generation of the mask layout.

At 705, there is an adjustment of the layout in which the method checks the relative positions of the macros for compliance to layout design rules after generating the mask layout.

At 707, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
   receiving, at a receiver, a signal modulated using Gaussian frequency shift keying (GFSK) from a transceiver;
   demapping, with the receiver, a bit pattern encoded within the signal;
   detecting, with the receiver, a preamble based on the demapped bit pattern; and synchronizing the transceiver to the receiver using the preamble,
wherein demapping the bit pattern is based on weighting coefficients multiplied by a difference between a first binary symbol distorted by inter-symbol interference (ISI) and a second binary symbol distorted by ISI.

2. The method of claim 1, wherein the weighting coefficients are determined based on GFSK modulation parameters.

3. The method of claim 1, wherein demapping the bit pattern is further based on a bias term.

4. The method of claim 3, wherein the value of the bias term is one of approximately 0.19 and approximately −0.19.

5. The method of claim 1, wherein a bit 0 of the preamble is encoded to a pattern of 0011 and a bit 1 of the preamble is encoded to a pattern of 1100.

6. The method of claim 1, wherein the weighting coefficients are determined according to:

$$\frac{1}{2}(\alpha_3 - \beta_3)y_{k+3} + \frac{1}{2}(\alpha_2 - \beta_2)y_{k+2} + \frac{1}{2}(\alpha_1 - \beta_1)y_{k+1} + \frac{1}{2}(\alpha_0 - \beta_0)y_k - \frac{1}{4}\sum_i (\alpha_i^2 - \beta_i^2) \leq 0$$

where $\gamma_{k+3}, \gamma_{k+2}, \gamma_{k+1}$, and $\gamma_k$ are the weighting coefficients and $\alpha_i$ and $\beta_i$ are the distorted binary symbols.

7. The method of claim 1, wherein the weighting coefficients are based on one of having a priori information and not having a priori information.

8. The method of claim 1, wherein the weighting coefficients are based on a previous symbol and a next symbol of the bit pattern.

9. The method of claim 1, wherein the preamble is included in a Bluetooth® low energy long range frame.

10. An apparatus, comprising:
a memory;
a processor; and
a receiver configured to:
receive a signal modulated using Gaussian frequency shift keying (GFSK) from a transceiver,
demap a bit pattern encoded within the signal,
detect a preamble based on the demapped bit pattern, and
synchronize the transceiver to a receiver using the preamble,
wherein demapping the bit pattern is based on weighting coefficients multiplied by a difference between a first binary symbol distorted by inter-symbol interference (ISI) and a second binary symbol distorted by ISI.

11. The apparatus of claim 10, wherein the weighting coefficients are determined based on GFSK modulation parameters.

12. The apparatus of claim 10, wherein the pattern demapper is further based on a bias term.

13. The apparatus of claim 12, wherein the value of the bias term is one of approximately 0.19 and approximately −0.19.

14. The apparatus of claim 10, wherein a bit 0 of the preamble is encoded to a pattern of 0011 and a bit 1 of the preamble is encoded to a pattern of 1100.

15. The apparatus of claim 10, wherein the weighting coefficients are determined according to:

$$\frac{1}{2}(\alpha_3 - \beta_3)y_{k+3} + \frac{1}{2}(\alpha_2 - \beta_2)y_{k+2} + \frac{1}{2}(\alpha_1 - \beta_1)y_{k+1} + \frac{1}{2}(\alpha_0 - \beta_0)y_k - \frac{1}{4}\sum_i (\alpha_i^2 - \beta_i^2) \leq 0$$

where $\gamma_{k+3}, \gamma_{k+2}, \gamma_{k+1}$, and $\gamma_k$ are the weighting coefficients and $\alpha_i$ and $\beta_i$ are the distorted binary symbols.

16. The apparatus of claim 10, wherein the weighting coefficients are based on one of having a priori information and not having a priori information.

17. The apparatus of claim 10, wherein the weighting coefficients are based on a previous symbol and a next symbol of the bit pattern.

18. The apparatus of claim 10, wherein the preamble is included in a Bluetooth® low energy long range frame.

19. A method of manufacturing a processor, comprising:
forming the processor as part of a wafer or package that includes at least one other processor, wherein the processor is configured to receive a signal modulated using Gaussian frequency shift keying (GFSK) from a transceiver, demap a bit pattern encoded within the signal, detect a preamble based on the demapped bit pattern, and synchronize the transceiver to a receiver using the preamble, wherein demapping the bit pattern is based on weighting coefficients multiplied by a difference between a first binary symbol distorted by inter-symbol interference (ISI) and a second binary symbol distorted by ISI; and
testing the processor, which includes testing the processor and at least one other processor using one or more electrical to optical converters, one or more optical splitters that split an optical signal into two or more optical signals, and one or more optical to electrical converters.

20. A method of constructing an integrated circuit, comprising:
generating a mask layout for a set of features for a layer of the integrated circuit, wherein the mask layout includes standard cell library macros for one or more circuit features that include a processor configured to receive a signal modulated using Gaussian frequency shift keying (GFSK) from a transceiver, demap a bit pattern encoded within the signal, detect a preamble based on the demapped bit pattern, and synchronize the transceiver to a receiver using the preamble, wherein demapping the bit pattern is based on weighting coefficients multiplied by a difference between a first binary symbol distorted by inter-symbol interference (ISI) and a second binary symbol distorted by ISI;
disregarding relative positions of the macros for compliance to layout design rules during the generation of the mask layout;
checking the relative positions of the macros for compliance to layout design rules after generating the mask layout;
upon detection of noncompliance with the layout design rules by any of the macros, modifying the mask layout by modifying each of the noncompliant macros to comply with the layout design rules;
generating a mask according to the modified mask layout with the set of features for the layer of the integrated circuit; and
manufacturing the integrated circuit layer according to the mask.

* * * * *